Sept. 9, 1924.  R. H. BOWEN  1,508,008
MANUFACTURE OF SHAFT HANGERS AND BLANKS FOR SAME
Original Filed Sept. 1, 1921   3 Sheets-Sheet 1
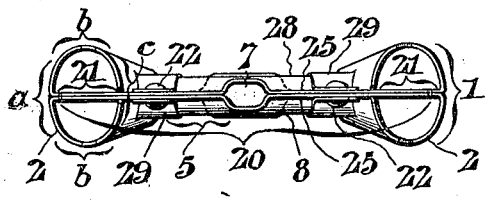
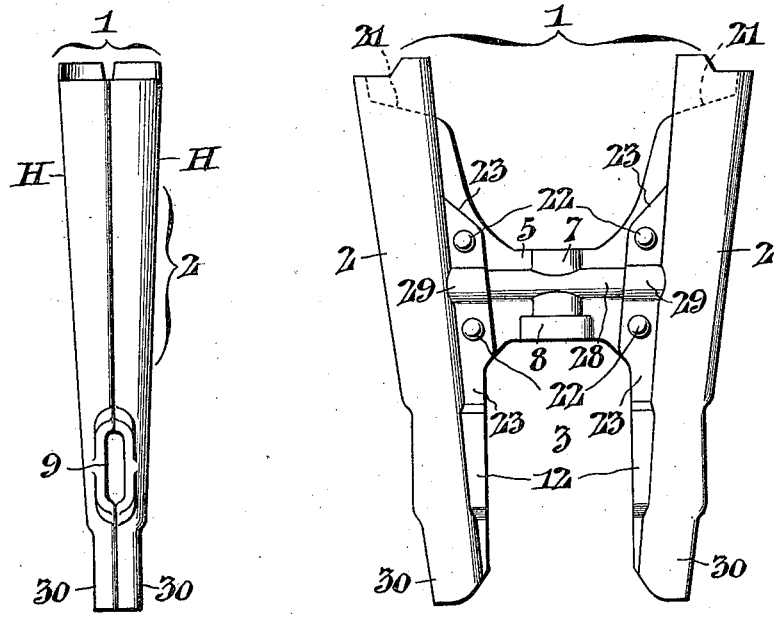
WITNESSES:
INVENTOR:
Russell H. Bowen,
BY
ATTORNEYS.

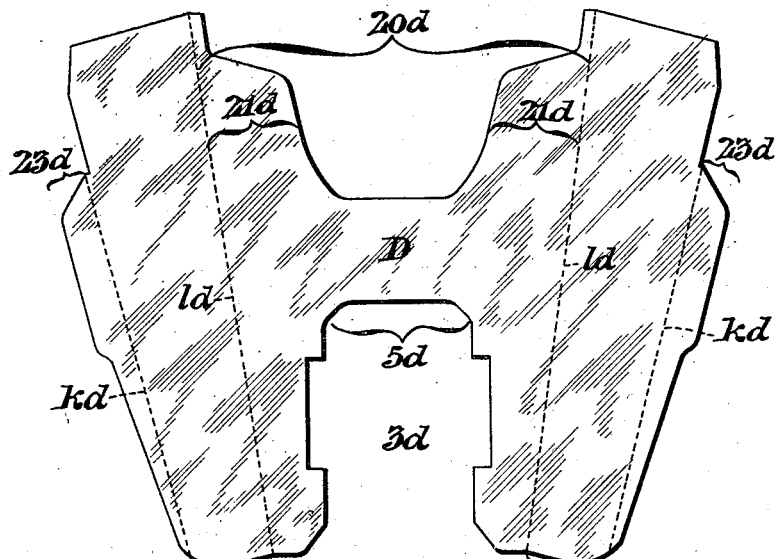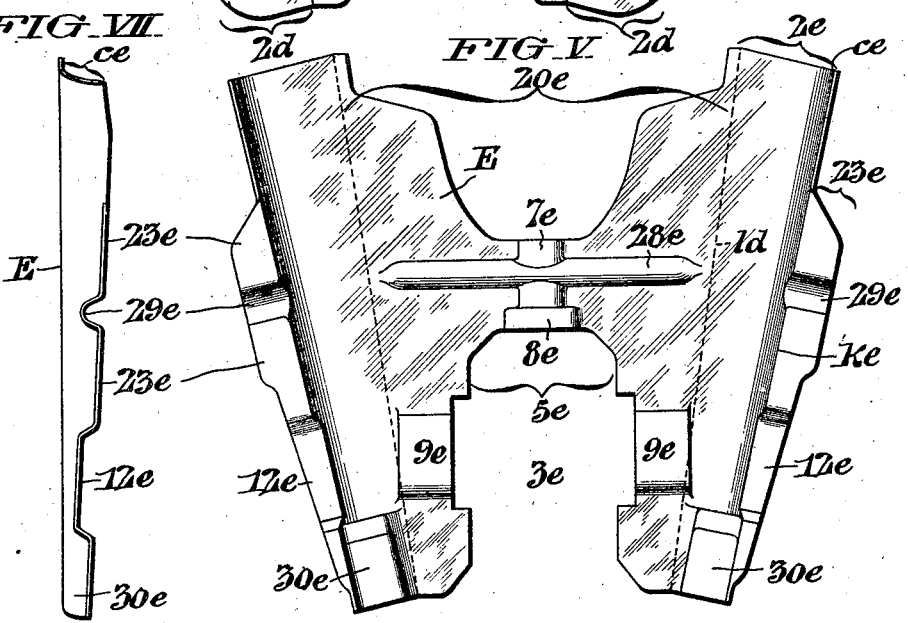

Sept. 9, 1924.    R. H. BOWEN    1,508,008
MANUFACTURE OF SHAFT HANGERS AND BLANKS FOR SAME
Original Filed Sept. 1, 1921    3 Sheets-Sheet 3
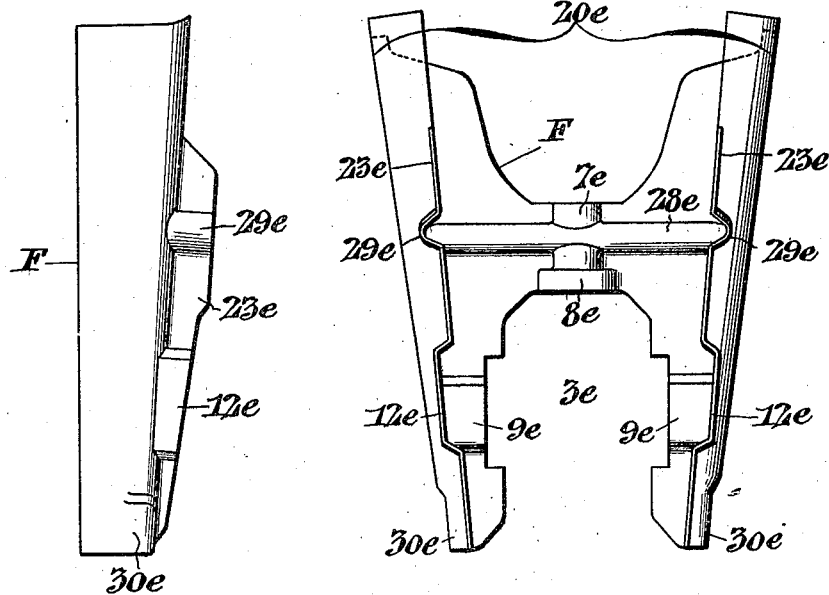
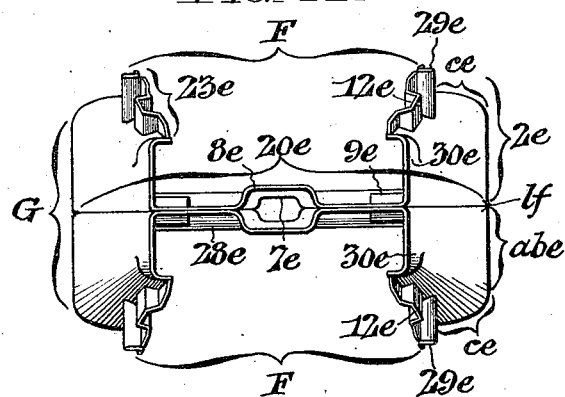
WITNESSES:
INVENTOR:
Russell H. Bowen,
BY
ATTORNEYS.

Patented Sept. 9, 1924.

1,508,008

UNITED STATES PATENT OFFICE.

RUSSELL H. BOWEN, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

MANUFACTURE OF SHAFT HANGERS AND BLANKS FOR SAME.

Application filed September 1, 1921, Serial No. 497,782. Renewed February 13, 1924.

*To all whom it may concern:*

Be it known that I, RUSSELL H. BOWEN, a citizen of the United States, residing in the city of Philadelphia, county of Philadelphia, State of Pennsylvania, have invented certain new and useful Improvements in the Manufacture of Shaft Hangers and Blanks for Same, whereof the following is a specification, reference being had to the accompanying drawings.

My invention relates to the manufacture of shaft hangers and the like, and especially hangers of sheet metal construction. By my new process, hangers of great strength, rigidity, and lightness can be easily and expeditiously manufactured at very moderate cost. The invention is particularly concerned with fabrication of the principal structural piece or "body" of the hanger,— consisting, ordinarily, of a pair of main strength members interconnected by a crossbrace.

My invention can best be explained through description of its practical application in a particular case: accordingly, I shall here describe the best way of carrying it out now known to me with special reference to the manufacture of a novel form of shaft hanger that is disclosed in my application, Serial No. 497,781, filed September 1, 1921, concurrently with this application, and entitled "Shaft hanger." From this description, it will be seen that in its most complete and elaborate form my invention comprehends various novel methods, operations, and steps that are useful otherwise than in the particular connection here described,—either in and by themselves, or in combination with steps and operations different from those associated with them in the particular case here described. It will also be seen that various stages of my preferred process yield partly manufactured products or blanks that are themselves new and adapted to become articles of commerce, and may in some instances be brought to completion in a variety of ways.

In the drawings, Fig. I is a front elevation of a hanger body piece constructed in accordance with my invention.

Fig. II is a side or edge view of the same piece, from the left of Fig. I.

Fig. III is a plan view of the same piece, as seen from the top of Figs. I and II.

Fig. IV shows a flat sheet metal blank suitable for the manufacture of one of the two pieces composing the body shown in Figs. I to III.

Fig. V shows the same blank embossed in preparation for bending it to final form.

Figs. VI and VII are edge views of the embossed blank shown in Fig. V, from the bottom and from the left of that figure, respectively.

Fig. VIII shows the blank at an intermediate stage of bending.

Fig. IX is a corresponding edge view, from the left of Fig. VIII.

Fig. X is an edge view, from the bottom of Fig. VIII, showing two embossed and bent blanks such as shown in Figs. VIII and IX superposed for welding together before completion of the bending operation.

In order to render my novel process of manufacture fully intelligible, a somewhat detailed preliminary description of the hanger body to be produced is required.

The hanger body piece 1 shown in Figs. I to III is for a hanger of what may be termed the "straddling" type, comprising a pair of principal strength members 2, 2 with an opening 3 between them for the shaft and its bearing (not shown) that are to be supported. The hanger 1 is shown in the upright position in which such shaft hangers are commonly used, and is here described (as a rule) in terms especially applicable to that position. The strength members 2, 2 are hollow, and have the form of downward-tapering legs or standards. Between them is an interconnecting cross brace member 5 having the general form of a transverse vertical web. Feet (not shown) for attaching the hanger to a floor or roof beam, for example, may be secured to the upper ends of the legs, and their lower ends may be connected by a bottom member or yoke (not shown), detachable to facilitate introduction of the shaft into the shaft opening 3. (The feet and the bottom yoke may be of any suitable types, and may be secured to the legs in any suitable way: for example, they may be constructed and secured as described in my above-mentioned application.) As shown, the side legs 2, 2 are only approximately vertical, sloping outward and diverging somewhat from their lower ends toward their upper ends, so as to give the hanger an amply broad transverse "base" at its top.

In order to accommodate an upper set-screw support (not shown) for the shaft and its bearing, the transverse member 5 has a somewhat elongated vertical opening or slot 7, and also an elongated seat 8 adapted to conceal an adjusting nut for said support and to hold such nut against turning. Also, the legs 2, 2 have elongated transverse openings or slots 9, 9 to accommodate lateral set-screw bearing-supports (not shown) and elongated seats 12, 12 adapted to conceal adjusting nuts for said supports and to hold them against turning.

The legs 2, 2 are hollow, as already mentioned. For convenience and brevity, they may be regarded as "facing" toward the shaft (not shown) supported by the hanger, and various portions of their contours or walls may be correspondingly distinguished as "backs" *a*, "sides" *b*, and "bellies" *c*. (The use of the word "sides" or "flanks" in this "leg anatomy" to designate the leg surfaces to right and left in Fig. II must not be confused, of course, with the use of similar terms, e. g., "side legs" and "sidewise", to express the relation of parts at right and left of Figs. I and III in reference to the hanger 1 as a whole and to the position of the shaft and bearing supported by it). Preferably (though not necessarily), the legs 2, 2 are closed—or virtually so—at least from the hanger feet to the lateral bearing-supports, and even beyond said supports, and are formed of sheet metal pressed or bent to shape with edges in proximity or abutting along the bellies *c*. As shown, the legs 2, 2 are of round tubular form substantially from end to end. They are not truly circular, however, but more nearly elliptical, with the major axes of the ellipses extending from right to left in Fig. II, so as to give the legs and the hanger ample strength in that direction.

Still referring to Figs. I to III, it will be seen that the hanger 1 comprises a web plate 20 that extends through the bellies *c* of the legs 2, 2, above the shaft opening 3, into their interiors. An intermediate portion of the plate 20, between the legs 2, 2, is of relatively narrow vertical width, and forms the web-like cross-brace 5, which interconnects the legs and serves to strengthen and stiffen the hanger as a whole sidewise (i. e., to right and left in Figs. I and III). Within and adjacent the legs 2, 2, the plate 20 "widens" vertically to such an extent as to form longitudinal internal webs 21, 21 in the legs that serve to reinforce and stiffen them sidewise of the hanger, in the common plane of the legs, and also reinforce and stiffen the hanger as a whole sidewise. This they do in various ways that need not be here described,—though fully set forth in my application above mentioned. The web 21 in each leg 2 extends clear to its back *a* and is integrally attached thereto along the whole line of meeting,—or practically the entire leg length. Furthermore, each web 21 is secured and attached to the leg belly *c* adjacent the brace 5, by means of rivets 22 extending through the web outside the leg 2 proper and through external longitudinal belly flanges 23 formed by outward extensions of the sheet metal of the two halves of the belly wall, one such flange at either side of the web. The back and belly attachments of the web portions 21, 21 of the plate 20 serve in many ways to reinforce and stiffen the legs 2, 2, sidewise of the hanger 1, as well as the hanger itself as a whole.

It will be observed that the plate 20 and its web portions 21, 21 are shown arranged centrally with reference to the legs 2, 2, substantially in their common axial or median plane. As shown, also, the web plate 20 with its portions 21, 21 are laminated or multi-ply, being composed of a couple of superposed metal sheets 25, 25. In the portion of each leg 2 where its bearing-support is located, the sheet metal 25 forming the web 21 is locally displaced laterally, by joggling, to afford between them the slot 9 for said bearing support. The seats 12, 12 for the corresponding adjusting nuts are formed by eversion of the belly walls *c* sufficiently to admit said nuts between the everted portions to seat against the inner or belly edges of the web 21. The slot 7 and seat 8 for the upper bearing-support are likewise formed in the cross-brace web 5 by local separation of the sheet metal plies 25, 25 in the way of outward embossing or joggling. Also, the web 5 is itself reinforced and stiffened by opposite outward embossments of its plies, in the form of rounded or circular transverse corrugations 28. These corrugations 28 extend into the interiors of the legs 2, 2 and there terminate a little short of their backs *a*,—the belly flanges 23, 23 of each leg being approximately corrugated at 29 to fit over the corrugations 28.

The leg ends 30, 30 are laterally flattened somewhat to facilitate attachment of the bottom yoke (not shown) already referred to.

It will now readily be seen that each leg 2 is in two originally separate half-round halves, each of which, as shown, is truly and ab initio integral with the adjacent ply or lamina 25 of the web plate 20,—though not so integral with the other leg half or with the other web ply. In other words, the main "body" piece of the hanger—comprising legs 2, 2 and cross-brace 5, but exclusive of feet and bottom yoke—may be regarded as originally "split", along the median plane of legs 2, 2 and web plate 20, into two separate pieces H, each consisting of one web lamination and half of each leg. Such, in fact, is the mode of construction according to my preferred process of manufacture,—which can now be intelligibly described. In order to make this description clearer, the various portions of the sheet metal employed are marked with the reference characters used in Figs. I to III to designate the portions or features of the hanger body eventually formed from them, plus certain distinctive suffixes indicative of the changes at various stages illustrated.

A flat metal sheet is cut or die punched to an outline appropriate for forming one of the hanger halves H,—the result being the flat blank D shown in Fig. IV. The proper outline for the blank D in any particular case can readily be determined, with a few trials, by methods well known to workers with sheet metal. It will be observed that this blank D comprises an intermediate portion $20^d$ between opposite outer vertical margins $2^d$ that extend vertically either way beyond the central intermediate portion $5^d$.

In order to convert this blank D into one of the hanger halves shown in Figs. I to III, two principal operations or alterations are now to be wrought upon it: various portions ($2^d$, $23^d$, $20^d$) are to be embossed in correspondence with the intended contours of various parts or features of the hanger, and opposite margins ($2^d$) are to be oppositely retroverted, toward or upon the face of the intermediate portion ($20^d$). The embossing must, I say, include embossing of the margins ($2^d$) in correspondence with the intended contour of the principal strength members or legs 2 of the hanger; and in order to give the leg backs $a$, $a$ of the hanger forms such as shown in Figs. I to III, the retroversion must include a more or less sharp lateral turning up of the margins in directions toward one another. Also, the edges ($23^d$) of the margins must be turned "down" (so to speak) more or less sharply to form the belly flanges 23 of the hanger.

While the main operations of embossing and turning the margins ($2^d$) can be combined, divided, and performed in various ways and in various relations to one another, I generally prefer to accomplish them by a progressive bending inward of the margins, starting at their outer portions. I also prefer to emboss the margins ($2^d$) and to turn them up in separate operations, and to divide the embossing into two stages and interpose the turning up between them. In this way, I can convert the blank D into a hanger piece H very conveniently and advantageously, as follows:

I first emboss the blank D in any suitable manner (as by die pressing in one or more sets of dies) substantially as shown in Figs. V to VII,—the result being the embossed blank E. While this blank still retains the character of a thin sheet, its intermediate portions $5^e$ and $20^e$ and its edges $23^e$ have been embossed upward and downward, respectively, as indicated, in correspondence with their intended contours in the hanger; also the edges $23^e$ have been sharply turned down at $k$ $e$ along the lines $k$ $d$ of Fig. IV, and the portions $30^e$ embossed upward slightly. The outer portions $c$ $e$ of the margins $2^e$ have also been embossed, by bending upward and inward, in correspondence with the intended contours of the legs in these regions,—which correspond in a general way to their bellies $c$ in Figs. I to III. Ordinarily, it is simplest and easiest to do no more than here shown in this first stage or step of the operations.

As the next step, I proceed to turn or bend up the margins $2^e$ of Figs. V to VII rather sharply toward the intermediate portion $20^e$, along the lines $l$ $d$ of Figs. IV to VII,—with the result of producing the embossed and turned up blank F shown in Figs. VIII to X. Here difference from Figs. V to VII is at once distinguishable in the substantially right angle bend at $l$ $f$. The portion of the margin $2^e$ between the region of previous embossing $c$ $e$ and the region of present turning or bending $l$ $f$ still remains substantially flat and undeformed (save at $30^e$) as in Figs. IV and V to VII. The bend at $l$ $f$ corresponds, it will be seen, to the over all width of the hanger piece H,—and of the entire hanger body piece,— from point to point lengthwise or vertically of the hanger.

The next operation or step in producing the piece H of Figs. I to III is to bend the margin $2^e$ of the blank F on inward toward and upon the intermediate portion $20^e$ of the blank. Before doing this, however, I generally prefer to superpose a couple of the blanks F flat to flat as shown in Fig. X, with their intermediate portions $20^e$, $20^e$, overlapping, and their retroverted portions $2^e$, $2^e$, at opposite faces of these portions, and to secure them together in that relation,—thus producing the double turned up and embossed blank G. For this purpose, the intermediate portions $20^e$ may be spot welded over all or part of their area of contact; or the blanks F, F may be welded along their outer corners $l$ $f$, $l$ $f$,—or both. In the final bending operation, the margins $2^e$ are bent between the regions $c$ $e$ and $l$ $f$, in the hitherto flat portions $a$ $b$ $e$ that correspond, roughly, to the sides and bellies $a$ and $b$ of the hanger legs 2. Some flexure may also occur, however, in other portions of the margins $2^e$,—notably in the bend or corners $l$ $f$ themselves, with the result of making them somewhat sharper than right angles, as shown in Fig. III at $l$.

After the final bending, a couple of the halves H, H are superposed and secured together as by welding or riveting,—provided, of course, this has not already been done,— and the now fully retroverted margins are attached to opposite faces of the intermediate portions 20ᵉ of the blanks, which now form the laminated web plate 20. This last may be done by riveting at 22 through the web 20 and the two belly flanges 23, 23 at opposite sides thereof, as shown in Figs. I and III; or the attachment of the belly flanges 23 may be supplemented or made stronger by spot welding or the like, which may even extend over their entire area of facial contact with the web 20. The hanger body piece 1 of Figs. I to III is now structurally complete, ready for the attachment of the feet and the bottom yoke (not shown) etc., with any incidental punching, drilling, etc.

Having thus described my invention, I claim:

1. A process of fabricating a sheet metal hanger piece which comprises embossing outer portions of opposite margins of a couple of sheet metal blanks, turning up said margins in correspondence with the overall width of the hanger piece to be produced, superposing and securing together a couple of the resulting pieces, bending the margins of said pieces on inward toward their respective intermediate portions by flexure between the regions of the aforementioned embossing and turning up, and securing the thus retroverted portions of the blanks to said intermediate portions.

2. A process of fabricating a sheet metal hanger piece which comprises embossing and retroverting upon their respective intermediate portions opposite margins of a couple of sheet metal blanks; and securing the blanks to one another with their aforesaid intermediate portions overlapping, and their retroverted portions to said intermediate portions.

3. A method for fabrication of a sheet metal hanger piece which comprises retroverting opposite embossed margins of a couple of sheet metal blanks upon their respective intermediate portions; and securing the blanks to one another with their aforesaid intermediate portions overlapping, and their retroverted portions to said intermediate portions.

4. A method for fabrication of a sheet metal hanger piece which comprises turning up opposite embossed margins of a couple of sheet metal blanks in correspondence with the overall width of the hanger piece to be produced, superposing and securing together a couple of the resulting pieces, and bending the margins of said pieces on inward toward their respective intermediate portions by flexure between the regions of the aforementioned embossing and turning up.

5. A method for fabrication of a sheet metal hanger piece which comprises securing together in superposition a couple of sheet metal blanks and turning up their margins in correspondence with the overall width of the hanger piece to be produced, and bending the turned up margins on back toward the intermediate portions of said blanks.

6. A method for fabrication of a sheet metal hanger piece which comprises embossing and retroverting upon an intermediate portion thereof opposite margins of a sheet metal blank, and securing said margins to said intermediate portion.

7. A method of fabricating a sheet metal hanger piece which comprises embossing outer portions of opposite margins of a sheet metal blank, turning up said margins in correspondence with the overall width of the hanger piece to be produced, and bending on inward toward the intermediate portion of the blank portions of said margins between the regions of the aforementioned embossing and turning up.

8. A method of fabricating a sheet metal hanger piece which comprises embossing opposite margins of a sheet metal blank and retroverting them upon an intermediate portion thereof.

9. The step in the fabrication of a sheet metal hanger piece which comprises retroverting opposite embossed margins of a sheet metal blank upon an intermediate portion thereof.

10. A method of fabricating a sheet metal hanger piece formed of a blank with opposite margins embossed and retroverted upon an intermediate portion of the blank, said method comprising progressive bending inward of said margins toward and upon the intermediate portion of the blank.

11. A method of fabricating a sheet metal hanger piece formed of a blank with opposite margins embossed and retroverted upon an intermediate portion of the blank, said method comprising embossing said margins, and turning them up in correspondence with the overall width of the hanger piece to be produced, in separate operations.

12. A method of fabricating a sheet metal hanger piece formed of a blank with opposite margins embossed and retroverted upon an intermediate portion of the blank, said method comprising progressive bending inward of said margins toward and upon the intermediate portion of the blank, sharply in correspondence with the overall width of the hanger piece to be produced, and gradually beyond the lines of sharp bending.

13. A method for fabrication of a sheet metal hanger piece which comprises turning up opposite margins of a sheet metal blank in correspondence with the overall width of the hanger to be produced and bending them on inward toward an intermediate portion of the blank.

14. The method for the fabrication of a sheet metal hanger piece which comprises embossing opposite margins of a sheet metal blank in correspondence with the intended leg contour of the hanger to be produced and turning them up in correspondence with the intended overall width of the hanger.

15. A blank for fabrication of a sheet metal hanger body piece comprising a sheet metal piece of appropriate shape with opposite margins embossed in correspondence with the intended leg contour of the hanger to be produced and turned up in correspondence with its overall width.

16. The step in the fabrication of a sheet metal hanger piece which comprises embossing opposite margins of an appropriately shaped sheet metal blank in correspondence with the intended leg contour of the hanger to be produced, and oppositely embossing an intermediate portion in correspondence with the intended contour of the hanger cross-brace.

17. A blank for fabrication of a sheet metal hanger body piece comprising a sheet metal piece of appropriate shape having opposite margins embossed in correspondence with the intended leg contour of the hanger to be produced, and an intermediate portion oppositely embossed in correspondence with the intended contour of the cross-brace of the hanger.

18. The step in the fabrication of a sheet metal hanger piece which comprises laterally turning up opposite outer margins of a sheet metal blank in directions toward one another in correspondence with the overall width of the hanger to be produced.

19. A blank for fabrication of a sheet metal hanger body piece comprising a sheet metal piece of appropriate shape with opposite outer margins turned up laterally, in directions toward one another, in correspondence with the overall width of the hanger to be produced.

20. The step in the fabrication of a sheet metal hanger piece which comprises bending on inward upon its intermediate portion the margins of a sheet metal blank turned up in correspondence with the overall width of the hanger to be produced.

In testimony whereof, I have hereunto signed my name, at Philadelphia, Pennsylvania, this 30th day of August, 1921.

RUSSELL H. BOWEN.

Witnesses:
JAMES H. BELL,
ANNA M. PETTERSON.